United States Patent Office 3,199,366
Patented Aug. 10, 1965

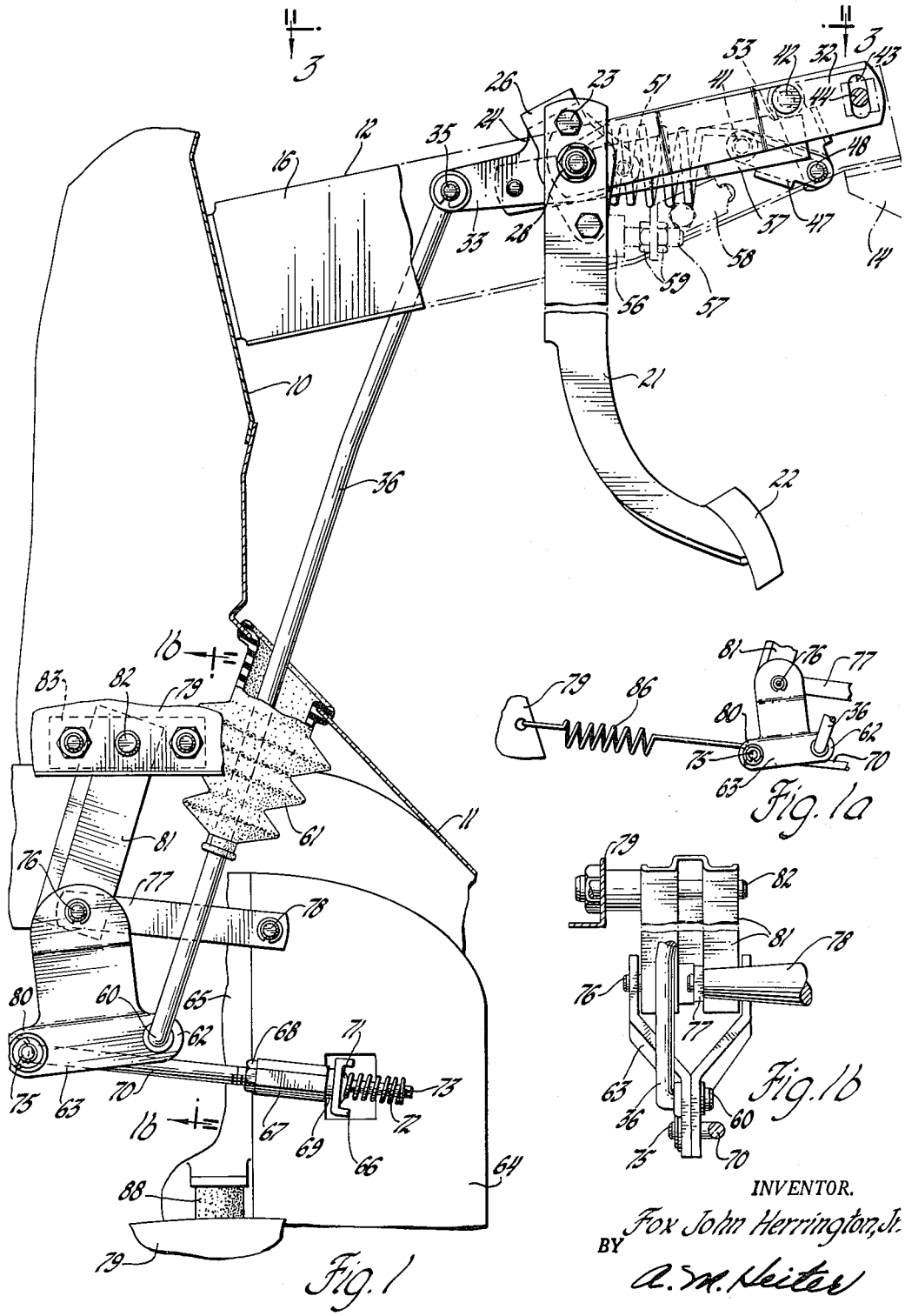

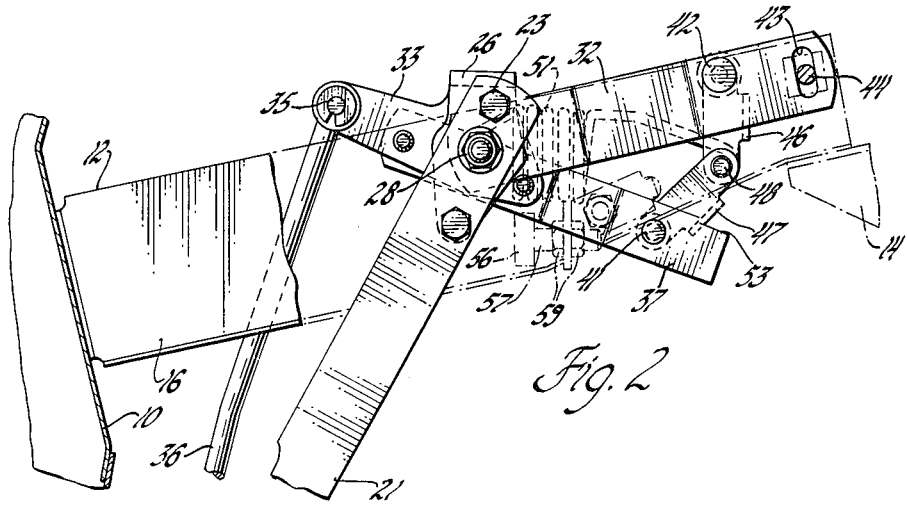
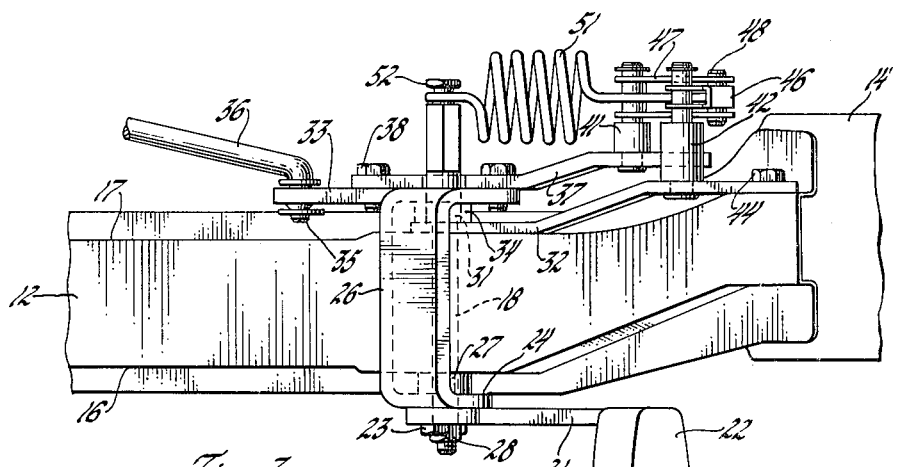
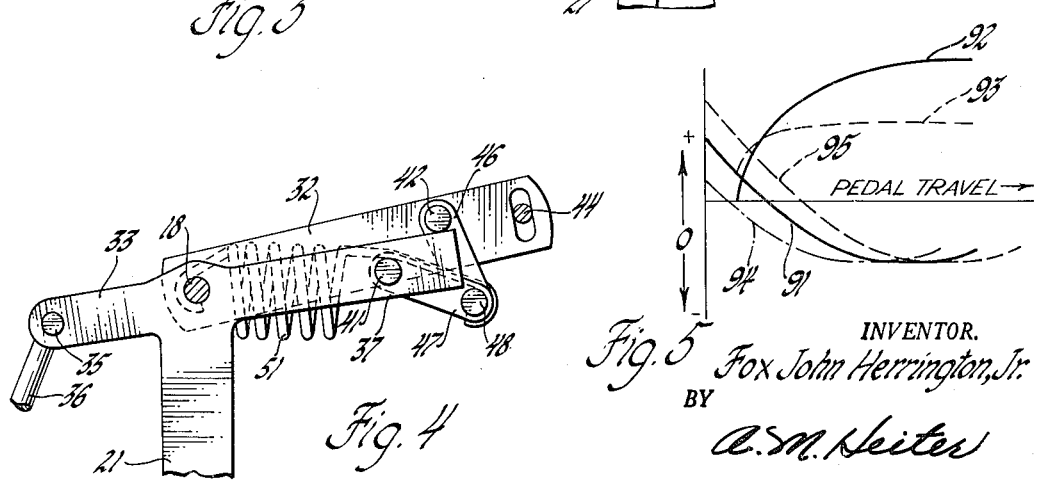

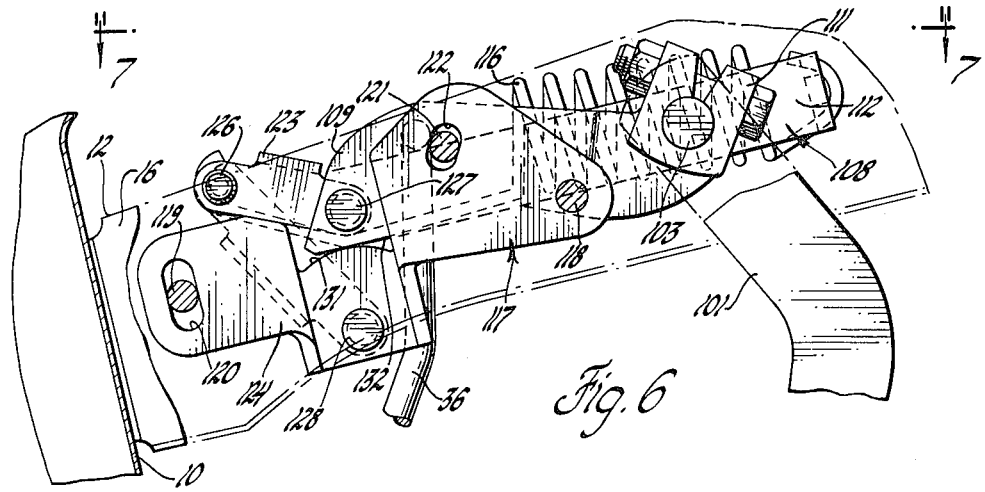

3,199,366
CONTROL LINKAGE
Fox John Herrington, Jr., Pontiac, Mich., assignor to General Motors Corporation, Detroit, Mich., a corporation of Delaware
Filed Dec. 22, 1960, Ser. No. 77,543
16 Claims. (Cl. 74—512)

This invention relates to control linkage mechanisms and particularly a clutch operating linkage having an over-center spring mechanism to provide a more uniform resistance to clutch pedal movement arranged so that the clutch pedal may be positioned without changing the action of the over-center spring mechanism.

In vehicles employing clutch pedal linkage control systems having over-center spring mechanisms to provide a more uniform and lower maximum clutch actuation pressure, it is necessary to maintain a proper relationship between clutch pedal position and the floor of the vehicle so that full release travel will be available. In order to maintain the proper over-center spring force relationship to pedal travel, it is necessary to move both the clutch lever and the over-center spring mechanism as a unit. The over-center spring mechanism includes a lever connected to the clutch pedal lever, a lever pivoted to the frame at substantially the same point as the clutch pedal, a motion limiting device on the levers, a pair of toggle links, one being connected to each of these levers, and a spring connected from the pivot between the toggle links to the clutch lever to provide the over-center action. The linkage is proportioned so that the spring resists initial slack take-up movement and assists clutch release movement so that the required operating force is substantially uniform. With this arrangement, the lever pivoted to the clutch lever to provide the over-center action, support and the whole assembly will rotate in unison without changing the action of the over-center spring mechanism.

An object of the present invention is to provide in an over-center spring control lever assist mechanism capable of resisting and augmenting the actuating force to provide a more uniform actuating force requirement over the full stroke, an arrangement whereby the control lever position may be adjusted without changing the resisting and augmenting operation of the over-center spring mechanism with relation to the stroke of the control lever.

Another object of the invention is to provide in a clutch control mechanism having an over-center spring and toggle mechanism, an adjustable stop device to determine the initial clutch pedal position which may be adjusted without changing the action of the over-center spring mechanism with relation to clutch pedal movement.

Another object of the invention is to provide in a linkage mechanism an over-center toggle spring mechanism for assisting the actuation of a control lever in a predetermined relation to the cycle of movement of the control lever and having positioning means for the control lever which may be adjusted to vary the initial position of the control lever without varying the action of the assist mechanism during each cycle of movement from a new initial location.

Another object of the invention is to provide in a linkage having a control member mounted on one support and a controlled member mounted on another support which may have limited movement relative to the one support, a lever interconnecting said control lever and said controlled lever pivotally supported on one support and said another support so that relative movement of said supports does not cause relative movement of said control and controlled members.

Another object of the invention is to provide in a linkage having a control member mounted on one support and a controlled member mounted on another support which may have limited movement relative to the one support, a lever interconnecting said control lever and said controlled lever pivotally supported by a pivot link parallel to and extending in the same direction as said control member pivoted to said one support and a pivot link parallel to and extending in the same direction as said controlled member pivoted to said another support.

These and other objects and advantages of the invention will become more fully apparent by reference to the accompanying specification and drawings wherein:

FIGURE 1 is a fragmentary elevational view of portions of a vehicle showing the structural arrangement and location of a clutch control system.

FIGURE 1A is a fragmentary view showing a detail of FIGURE 1.

FIGURE 1B is a fragmentary view showing a detail of FIGURE 1.

FIGURE 2 is an elevational view of the toggle mechanism of the clutch control system in the clutch release position.

FIGURE 3 is a top view of part of FIGURE 1 on the line 3—3.

FIGURE 4 is a schematic view of the over-center toggle mechanism in the clutch engaged position.

FIGURE 5 shows representative clutch pedal pressure curves.

FIGURE 6 is an elevational view of a modified over-center toggle mechanism.

FIGURE 7 is a view of FIGURE 6 taken on line 7—7.

FIGURE 8 is a schematic view of the over-center spring toggle mechanism in the clutch released position.

Referring to FIGURE 1, the invention is illustrated in a clutch control system mounted in a vehicle frame including a fire wall 10, a floor 11, and instrument panel 14 and a support 12 mounted on the fire wall 10 and the panel 14. As shown in FIGURES 1–3, the support 12 is a channel shaped member having downwardly extending side flanges 16 and 17 in which the pivot shaft 18 is secured. The clutch pedal lever 21, having a suitable pedal 22 for foot operation, is suitably secured, as by screws 23, to a leg 24 of the strap shaft member 26, which is pivotally mounted on a shaft 18 by bushing 27 and secured in place by nut 28. The nut 28 also axially locates shaft 18 by drawing a shoulder 31 against auxiliary lever 32 which engages the flange 17. At the other leg of the straped lever 26 there is a lever extension 33 suitably apertured for pivotal mounting on the bushing 34 on shaft 18 and also apertured to pivotally receive the offset end portion 35 of rod 36 which is connected as described below to the clutch operating mechanism. The lever 33 has an extension portion 37 which is secured thereto by screws 38.

The portion 37 of the clutch or operating lever assembly has a stud shaft 41 fixed to it at a point spaced from shaft 18. The auxiliary 32 is suitably apertured at one end and pivotally mounted on the shaft 18 and adjacent the other end has a stud shaft 42 fixed thereto and at the other end has a slot 43 through which the screw 44 passes. The screw 44 is threaded into the support member 12 to adjustably secure the lever 32 in a number of angular positions. The toggle links 46 and 47 are pivoted together at one end by a pin 48 and at the opposite end are pivoted respectively to the stud shafts 42 and 41 to provide a toggle link connection between the levers 32 and 37. As shown in the drawings, each of the toggle links consists of a pair of link members with a central bridge portion extending between the link members to provide a rigid sheet metal link. A spring 51 of the coil type is connected between the extension 52 of shaft 18 which may be grooved to limit lateral movement of the spring 51 and the center point 48 of the toggle links. The lever portion 37 has a stop surface 53 which engages the stud shaft or stop 42 in the clutch engaged position to limit movement of the linkage mechanism. The return or clutch apply movement of the clutch pedal 21 as it reaches the stop 53–42 is snubbed by a rubber bumper 56 mounted on a stud 57 on a bracket 58 and secured in position by locknuts 59.

The actuating rod 36 extends through an aperture in the floor 11 sealed by a boot 61 and is pivotally connected by an offset portion 60 to one arm 62 of the floating lever 63, as shown in FIGURE 1. The clutch 64 of conventional construction has an operating fork 66 extending therefrom. The rod 70 is universally connected to the fork 66 by an adjustable ball joint consisting of a ball member 67 threaded on the shaft 70 and locked in place by a locknut 68 and having a spherical end 69 engaging a spherical depression 71 formed in the lever 66. The lever 66 has an aperture in the center of the depression 71 through which the rod 70 extends. A spring 72 engages an abutment 73 at the end of rod 70 and the lever 66 to hold the two parts of universal joint 69–71 in operating position. The rod 70 is connected by an offset pivot portion 75 to the second arm 80 of lever 63. The third arm of the bellcrank 63 has a pivot pin 76. A link 77 extending parallel to rod 70 is pivoted by pin 78 to the engine clutch assembly 64–65 and pivoted by pin 76 to lever 63. The pivot pin 76 is also connected by a link 81 extending parallel to rod 36 to a pivot pin 82 mounted by a bracket 83 on the vehicle frame part 79. This mounting for the pivot 76 for floating lever 63 varies the position of pivot 76 in accordance with the relative position of the vehicle frame and the engine clutch assembly. Since the lever 63 and link 81 must withstand compressive stress, the link 81 is formed as a W or corrugated link, and the lever 63 is formed as a stirrup lever, as shown in FIGURE 1B. In order to take up lash in the linkage, the lever 63 is connected by a spring 86 to the frame 79.

This clutch control linkage operates to provide a substantially constant or uniform force required to actuate the clutch pedal. The clutch pedal is shown in FIGURE 1 in the clutch engaged position which is the normal position with the stop surface 53 engaging the stop pin 42. It will be seen that in this position, the spring 51, acting on the joint 48 of toggle links 46 and 47, tends to hold the lever 37 and clutch lever 21 in the clutch engaged position. The spring 51 applies to the clutch pedal 21 and clutch operating mechanism a force as shown by curve 91 in FIGURE 5. In the initial pedal position, shown in FIGURES 1 and 4, this force urging the clutch toward the engaged position is a maximum. As the pedal is moved in a release direction toward the position shown in FIGURE 2, this force is reduced as shown in curve 91, and is zero when link 47 and spring 51 are in alignment. Further movement toward the position shown in FIGURE 2 provides a negative force, or a force assisting clutch pedal disengaging movement as shown by curve 91. As clearly indicated by curve 91, this is an assymetrical toggle linkage providing a force in the positive direction for a short distance of travel, and then providing, for a longer distance of travel, a force in the negative direction.

During pedal travel for clutch release, as illustrated in FIGURE 5, the force required to move the clutch fork lever 66 is zero for an initial period in which the slack is taken up and then rises rapidly along curve 92 to a maximum value. Curves 91 and 92 are added together to obtain curve 93, which shows the manual force required by the operator to release the clutch. It will be noted that when curves 91 and 92 cross in the proper place, that the summation pressure curve 93 is fairly consistent or uniform. This is not materially affected by clutch wear which will reduce the slack take-up portion of the travel between the zero point of pedal travel and the beginning of curve 92 and thus merely shift curve 92 toward zero travel. However, shifting of the toggle spring mechanism force curve 91 relative to the zero pedal travel position of the pedal for the fully engaged position of the pedal, will seriously affect the net curve 93. This is illustrated in FIGURE 5 by curve 94 showing a reduction in the initial resistance of the toggle spring mechanism. Whenever the toggle spring mechanism provides a negative force during the slack take-up period, the device will be rendered inoperative since the clutch pedal will not return to the zero position. If the force curve provided by the toggle mechanism is moved to the right, as indicated by the curve 95, providing a higher initial resistance than necessary, it will provide substantially no assistance where it is required when the maximum force is required as indicated by curve 92. Thus, when either curve 94 or 95 is added to curve 92, it would not produce as satisfactory a summation curve of the operating force required as curve 93. Thus it is important that the relationship between the required pedal force or clutch release force, indicated by curve 92, be maintained with regard to the toggle spring force illustrated by curve 91. To properly position the clutch pedal 21 so that there is sufficient clearance above the floor 11 for full pedal travel and complete release, the pedal 21 is positioned by rotating the complete toggle spring mechanism about the pivot shaft 18 by loosening screw 44 and rotating the lever 32 and abutment or stud shaft 42. Since the toggle mechanism holds lever 37 in engagement with abutment shaft 42, the whole mechanism for pedal 21 will rotate together and the relationship of the toggle mechanism and the forces supplied thereby to the clutch actuating linkage will not be changed with regard to pedal travel from its initial position.

The rod 36 is connected to the clutch operating fork lever 66 by the floating lever 63 to move fork lever 66 corresponding to movement of pedal 21 and to eliminate vibration or extraneous movement of the fork 66 due to relative movement between the clutch and engine assembly 64–65 with respect to the frame 79. The engine, clutch and transmission assembly is mounted by conventional resilient rubber vibration dampening mountings 88 on the frame which permit considerable relative movement of this assembly relative to the vehicle frame. Thus, if the clutch lever mechanism 21, which is mounted on the frame is directly connected to the fork 66, the relative movement between frame and clutch would cause lever 66 to move. In this arrangement, the pivot pin 76, supporting floating lever 63, is supported by pivot link 81 extending parallel to rod 36 and pivoted to the frame and pivot link 77 extending parallel to the control rod 70 and pivoted to the clutch to provide a movable pivot point connecting for relative movement between the engine clutch assembly and the frame. Though for perfect parrallelogram movement, it would be necessary to have the link 81 parallel to and the same length as the lever 36 and the link 77 parallel to and the same length as the lever 66, it has been found that due to the small arc of movement involved that shorter links 81 and 77 may be used to prevent any significant transfer of movement to the clutch lever 66 due to relative movement between the clutch and vehicle frame. The usual engine mounting permits more relative movement between the engine clutch assembly and the vehicle frame in a vertical direction than in a horizontal fore and aft direction. The link 77 is therefore made substantially as long as rod 70 so that practically true parallelogram movement is obtained. Then the relatively large movement between the clutch and frame does not produce any significant movement between rod 36 and rod 70. Because the relative fore and aft movement is smaller, link 81 may be substantially shorter than rod 36. Due to the small arc of movement, there is no significant relative movement between rod 36 and rod 70.

The rod 36 connecting the over-center mechanism and the floating lever has a fixed length to maintain the same relationship between the assisting and resisting forces provided in clutch actuation regardless of the initial pedal position. The adjustable universal joint 67 permits adjustment for clutch wear without interfering with the action of the over-center mechanism or the floating lever connection.

The modified toggle spring mechanism illustrated in FIGURES 6-8 is similarly mounted on a channel support member 12 located between the fire wall 10 and the instrument panel 14. The clutch pedal lever 101 has a pedal 102 and is suitably secured at the other end to a shaft 103 rotatably mounted in bushings 104 and 106 located respectively in the side 16 and 17 of channel support 12. An operating lever assembly 108 has a lever portion 109 connected by a clamp 111 to the shaft 103 and also an abutment portion 112 secured to the lever part 109 and having a lateral projection 114 to provide an anchor for one end of the spring 116. The clutch control rod 36 is pivotally connected to the lever 109.

The positioning support lever 117 is pivotally secured by the screw 118 to the support 12. The angular position of support lever 117 about screw 118 may be adjusted by loosening screw 119 and moving the lever within the limits of slot 120 and secured in place by tightening this screw. The screw 121 fits in a slot 122 in lever 117 to assist in retaining lever 117 in its vertical position. The toggle links 123 and 124 are pivoted together by pin 126. The link 123 is pivoted on a pivot shaft 127 secured to the outer end of lever 109 and the link 124 is pivoted to a pivot shaft 128 secured to the support lever 117. The toggle links 123 and 124 are formed of two links having a central connecting bridging portion. Spring 116 is anchored at one end of projection 114 of abutment portion 112 and is anchored at the other end to pin 126. Support lever 117 has an offset arcuate portion 131 formed as an arc about the center of pivot shaft 128 in vertical alignment with the lower edge portion 132 of lever 109. The surface 132 may be straight as shown or curved.

The operation of the clutch lever illustrated in FIGURES 6-8 is similar to that shown in the above preferred embodiment. In an initial position in FIGURE 6, the clutch pedal lever 101 is positioned by surface 132 of operating lever portion 109 being in contact with the stop surface 131 on the support lever 117. The toggle links 123 and 124 receive the force of spring 116 to hold these links in the position shown with the highest force resisting movement of the clutch lever in any phase of operation. As the clutch lever 101 is moved first to take up slack, and then to the disengaged position, the lever portion 109 pivots with shaft 103 and moves the toggle to reduce the resisting force and at the position in which toggle link 123 is aligned with spring 116 provides zero force due to spring 116 acting on clutch control mechanism. Thus in this position, the spring neither assists nor retards clutch pedal movement. Further movement in the release direction to the position, shown diagrammatically in FIGURE 8, is assisted by an increasingly large force derived from spring 116 so that the manual force that must be applied to the clutch pedal lever 101 is substantially reduced as explained above in connection with FIGURE 5.

The position of the pedal in this modification may be adjusted without varying the relationship of the spring force 116 to pedal actuation. This may be done by loosening screw 119 secured to the support 12 to loosen the support lever 117 so that it may be rotated about pivot screw 118. In this way, the initial position of the lever 109, clutch pedal lever 101 may be determined and the relative position of the toggle mechanism, and particularly links 123 and 124, will not be varied with relation to the initial position so that the relationship of resisting and assisting forces obtained from spring 116, in conjunction with clutch actuation is maintained the same in each adjusted position. Though for perfect geometry, support lever 117 is preferably pivoted about the center of shaft 103 as shown in FIG. 8, the small displacement of pivot 118 as shown in FIG. 6 on the line between the center of the shaft 103 and center of pivot shaft 128 provides substantially perfect geometry.

The above described preferred embodiments of the invention are illustrated in one conventional location in a vehicle and the references to the parts as horizontal, vertical, up, down and the like, are merely for clarity and ease of reference to the drawing. It will be appreciated that the linkage may be located in any relationship to horizontal and that only the specified relative relationship of the parts is critical.

The above described preferred embodiments are illustrative of the invention which may be modified within the scope of the appended claims.

I claim:

1. In a vehicle clutch operating mechanism wherein relative movement between the vehicle and the clutch does not affect the operating mechanism; a support; a clutch resiliently mounted on said support for limited vibration damping movement and having a clutch actuating lever; an operating lever pivotally mounted on said support to receive operating force to move said operating lever from an initial position in one direction through a first range of movement and then through a second range of movement; assist means connected between said operating lever and said support to act on said operating lever to resist movement in said first range and assist movement in said second range; means to selectively limit movement of said operating lever in the opposite direction at each of a plurality of initial positions and to provide the same amount of said resisting and assisting forces with the same distance of movement from each initial position; means connecting said operating lever to said clutch lever supported jointly on said support and clutch to prevent relative movement of said support and clutch causing relative movement of said operating lever and clutch lever.

2. In a vehicle clutch operating mechanism wherein relative movement between the vehicle and the clutch does not affect the operating mechanism; a support; a clutch resiliently mounted on said support for limited vibration damping movement and having a clutch actuating lever; an operating lever pivotally mounted on said support to receive operating force to move said operating lever from an initial position in one direction through a first range of movement and then through a second range of movement; assist means connected between said operating lever and said support to act on said operating lever to resist movement in said first range and assist movement in said second range; means adjustable to selectively limit movement of said operating lever in the opposite direction at a plurality of initial positions and to provide the same amount of said resisting and assisting forces with the same distance of movement from each initial position as said operating lever and said assist means are adjusted about a common pivot; a floating lever, means connecting said operating lever to said floating lever, means connecting said floating lever to said clutch lever, means to support said floating lever jointly on said support and clutch to move said floating lever in response to relative movement of said support and clutch to prevent relative movement of said support and clutch causing relative movement of said operating lever and clutch lever.

3. In a vehicle clutch operating mechanism wherein relative movement between the vehicle and the clutch does not affect the operating mechanism; a support; a clutch resiliently mounted on said support for limited vibration damping movement and having a clutch actuating lever; an operating lever pivotally mounted on said support to receive operating force to move said operating lever from an initial position in one direction through a first range of movement and then through a second range of movement; assist means connected between said operating lever and said support to act on said operating lever to resist movement in said first range and assist movement in said second range with an amount of force proportional to the distance moved from said initial position; means to selectively limit movement of said operating lever in the opposite direction at a plurality of initial positions and to provide the same resisting and assisting forces with the same amount of force in the same proportion to the same distance moved from each initial position; a floating lever, means having a fixed length connecting said operating lever to said floating lever, means having an adjustable length connecting said floating lever to said clutch lever, means to support said floating lever jointly on said support and clutch to move said floating lever in response to relative movement of said support and clutch to prevent relative movement of said support and clutch causing relative movement of said operating lever and clutch lever.

4. In a vehicle clutch operating mechanism wherein relative movement between the vehicle and the clutch does not affect the operating mechanism; a support; a clutch resiliently mounted on said support for limited vibration damping movement and having a clutch actuating lever; an operating lever pivotally mounted on said support; means operatively connecting said clutch actuating lever and said operating lever; said operating lever receiving operating force to move said operating lever from an initial position in one direction through a first range of movement and then through a second range of movement, auxiliary support lever means pivotally mounted on said support; means to adjustably secure said auxiliary support lever means in a plurality of initial positions with respect to said support; stop means on said auxiliary support lever means and said operating lever to limit movement of said operating lever in the opposite direction at said initial position; and assist means connected between said operating lever and said auxiliary support lever to act on said operating lever to bias it against said stop means at said initial position and to resist movement in said first range and assist movement in said second range.

5. In a vehicle clutch operating mechanism wherein relative movement between the vehicle and the clutch does not affect the operating mechanism; a support; a clutch resiliently mounted on said support for limited vibration damping movement and having a clutch actuating lever; an operating lever pivotally mounted on said support to receive operating force to move said operating lever from an initial position in one direction through a first range of movement and then through a second range of movement, auxiliary support lever means pivotally mounted on said support about the pivot axis of said operating lever; means to adjustably secure said auxiliary support lever means in a plurality of positions with respect to said support; stop means on said auxiliary support lever means and said operating lever to limit movement of said operating lever in the opposite direction at said initial position; assist means connected between said operating lever and said auxiliary support lever to act on said operating lever to bias it against said stop means at said initial position and to resist movement in said first range and assist movement in said second range with equal force regardless of the adjusted position of said auxiliary support lever; a floating lever, a first linkage connecting said operating lever to said floating lever including a first rod pivoted to said floating lever, a second linkage connecting said floating lever to said clutch lever including a second rod pivoted to said floating lever, a first support link parallel to said first rod and pivoted to said floating lever and to said support and a second support link parallel to said second rod and pivoted to said floating lever and to said clutch.

6. In a vehicle clutch operating mechanism wherein relative movement between the vehicle and the clutch does not affect the operating mechanism; a support; a clutch resiliently mounted on said support for limited vibration damping movement and having a clutch actuating lever; an operating lever pivotally mounted on said support to receive operating force to move said operating lever from an initial position in one direction through a first range of movement and then through a second range of movement, an auxiliary support lever pivotally mounted on said support about the pivot axis of said operating lever; stop means on said auxiliary support lever and said operating lever to limit movement of said operating lever in the opposite direction at said initial position; assist means connected between said operating lever and said auxiliary support lever to act on said operating lever to bias it against said stop means at said initial position and to resist movement in said first range and assist movement in said second range; means to adjustably secure said auxiliary support lever in a plurality of positions with respect to said support to adjust the initial position of said operating lever; said auxiliary support lever and said operating lever moving about a common pivot when said auxiliary support lever is adjusted whereby the same relationship between the amount of force and the amount of movement required to actuate said operating lever from all initial positions is maintained; a linkage connecting said operating lever to said clutch lever including a floating lever, a first rod pivoted to said floating lever and connected to said operating lever, a second rod pivoted to said floating lever and connected to said clutch lever, a first support link parallel to said first rod and pivoted to said floating lever and to said support and a second support link parallel to said second rod and pivoted to said floating lever and to said clutch.

7. In a vehicle clutch operating mechanism wherein relative movement between the vehicle and the clutch does not affect the operating mechanism; a support; a clutch resiliently mounted on said support for limited vibration damping movement and having a clutch actuating lever; an operating lever pivotally mounted on said support to receive operating force to move said operating lever from an initial position in one direction through a first range of movement and then through a second range of movement; auxiliary support lever means pivotally mounted on said support about the pivot axis of said operating lever; means to adjustably secure said auxiliary support lever means in a plurality of positions with respect to said support; stop means on said auxiliary support lever and said operating lever to limit movement of said operating lever in the opposite direction at said initial position; assist means including a pair of toggle links having a central pivot and end pivots connected between said operating lever and said auxiliary support lever means, and spring means anchored to said support and said toggle linkage to act on said operating lever to bias it against said auxiliary support lever stop means at said initial position and to resist movement in said first range of movement and assist movement in said second range of movement; a linkage connecting said operating lever to said clutch lever including a floating lever, a first rod pivoted to said floating lever and connected to said operating lever, a second rod pivoted to said floating lever and connected to said clutch lever, a first support link extending parallel to said first rod and pivoted to said floating lever and to said support, and a second support link parallel to said second rod and pivoted to said floating lever and to said clutch whereby said floating lever compensates for relative movement between said clutch and said support to prevent transfer of such movement to said clutch lever.

8. In a vehicle clutch operating mechanism wherein relative movement between the vehicle and the clutch does not affect the operating mechanism; a support; a clutch resiliently mounted on said support for limited vibration damping movement and having a clutch actuating lever; an operating lever pivotally mounted on said support having an apply portion to receive operating force to move said operating lever from an initial position in one direction through a first range of movement, and then through a second range of movement, a delivery portion to deliver an operating force, and a control portion operative to receive an auxiliary resisting and assisting force; auxiliary support lever means pivotally mounted on said support about the pivot axis of said operating lever; means to adjustably secure said auxiliary support lever means in a plurality of positions with respect to said support; stop means on said auxiliary support lever and said operating lever to limit movement of said operating lever in the opposite direction at said initial position; assist means including a pair of toggle links having a central pivot and end pivots connected between said control portion of said operating lever and said auxiliary support lever means, and spring means anchored to said support and said central pivot of said toggle linkage to act on said operating lever to bias it against said stop means at said initial position and to resist movement in said first range of movement and assist movement in said second range of movement; a linkage connecting said delivery portion to said clutch lever including a floating lever, a first rod pivoted to said floating lever and connected to said delivery portion, a second rod pivoted to said floating lever and connected to said clutch lever, a first support link extending parallel to said first rod and pivoted to said floating lever and to said support, and a second support link parallel to said second rod and pivoted to said floating lever and to said clutch whereby said floating lever compensates for relative movement between said clutch and said support to prevent transfer of such movement to said clutch lever.

9. In a control linkage mechanism; a support having a pivot; an operating lever pivotally mounted on said pivot and having apply means for receiving an operating force to move said operating lever in one direction from an initial position, delivery means for delivering an actuating force and control means for receiving an auxiliary force; means connected to said control means of said operating lever and said support to selectively limit movement in the opposite direction at any one of a plurality of selected initial points and to provide said auxiliary force resisting and assisting movement of said operating lever with the same amount of force at the same distance of movement on movement from each of said plurality of initial points.

10. In a control linkage mechanism; a support having a pivot; an operating lever pivotally mounted on said pivot and having apply means for receiving an operating force to move said operating lever in one direction from an initial position, delivery means for delivering an actuating force and control means for receiving an auxiliary force; stop means engaged by said operating lever and mounted on said support to limit movement of said operating lever in the opposite direction at an initial point, assist means connected to said operating lever and said support to provide an auxiliary force resisting and assisting movement of said operating lever with a predetermined force proportional to the degree of movement of said operating lever from said initial position and means mounting said stop means and said assist means on said support and being selectively moveable to simultaneously adjust said stop means and said assist means to change said initial position of said operating lever to any one of a plurality of initial points and to control said assist means to provide during operation from each of said initial points, when used as the initial position of said operating lever, the same predetermined force in the same proportion to the degree of movement from each initial point.

11. In a control linkage mechanism; a support having a pivot; an operating lever pivotally mounted on said pivot on said support and having an apply portion to receive an operating force to move said operating lever from an initial position in one direction through a first range of movement and then a second range of movement, a delivery portion to deliver an actuating force, and a control portion operative to receive an auxiliary resisting and assisting force; an auxiliary support lever pivotally mounted on said pivot on said support about the pivot axis of said operating lever; means to adjustably secure said auxiliary support lever in a plurality of positions with respect to said support to provide a plurality of said initial positions whereby the operating force and linkage movement are not changed; said auxiliary lever having stop means thereon to limit movement of said operating lever in the opposite direction at said initial position; and over-center means including a pair of toggle links having a common central pivot joint and respective end pivots connected between said control portion and said auxiliary lever and including spring means anchored to said pivot on said support and said toggle joint to urge said operating lever against said stop means at each of said initial positions and to resist movement of said operating lever in said one direction in said first range of movement and assist movement of said operating lever in said second range of movement.

12. In a control linkage mechanism; a support having a pivot; an operating lever pivotally mounted on said pivot on said support to receive an operating force to move said operating lever from an initial position in one direction through a first range of movement and then through a second range of movement, an auxiliary support lever pivotally mounted on said support; said auxiliary support lever having stop means thereon to limit movement of said operating lever in the opposite direction at said initial position; assist means connected between said operating lever and said auxiliary support lever to urge said operating lever against said stop means at said initial position and to resist movement of said operating lever in said one direction in said first range of movement and assist movement of said operating lever in said second range of movement, and means to adjustably secure said auxiliary support lever in a plurality of positions to said support whereby the operating force and linkage movement are not changed to provide any one of a plurality of initial positions for said operating lever and to control said assist means to maintain the same assisting and resisting forces in said first and second ranges of movement.

13. In a control linkage mechanism; a support; an operating lever pivotally mounted on said support having means to receive operating force to move said operating lever from an initial position in one direction through a first range of movement and then a second range of movement, delivery means to deliver an actuating force, and control means operative to receive an auxiliary resisting and assisting force; auxiliary support lever means pivotally mounted on said support; means to adjustably secure said auxiliary support lever means in a plurality of positions with respect to said support to provide a plurality of initial positions for said operating lever whereby the operating force and said operating lever movement are not changed; said auxiliary support lever means having stop means thereon to limit movement of said operating lever in the opposite direction at said initial position; and assist means connected between said control means and said auxiliary lever means to urge said operating lever against said stop means at said initial position and to resist movement of said operating lever in said one direction in said first range of movement and assist movement of said operating lever in said second range of movement.

14. In a control linkage mechanism; a support; an operating lever pivotally mounted on said support for rotary movement about an axis and having an apply portion to receive operating force to move said operating lever from an initial position in one direction through a first range of movement and then a second range of movement, a delivery portion to deliver an operating force, and a control portion operative to receive an auxiliary resisting and assisting force; auxiliary support lever means pivotally mounted on said support near said axis of said operating lever; means to adjustably secure said auxiliary support lever means in a plurality of positions with respect to said support whereby the operating force and linkage movement are not changed; said auxiliary support lever having stop means thereon movable with said auxiliary lever means to limit movement of said operating lever in the opposite direction at said initial position; and over-center means including linkage means connected between said control portion and said auxiliary support lever means and including spring means anchored to said support and said linkage means to urge said operating lever against said stop means at said initial position and to resist movement of said operating lever in said one direction in said first range of movement and assist movement of said operating lever in said second range of movement.

15. In a control linkage mechanism; a support; an operating lever pivotally mounted on said support for rotary movement about an axis having an apply portion to receive an operating force to move said operating lever from an initial position in one direction through a first range of movement and then a second range of movement, a delivery portion to deliver an actuating force, and a control portion operative to receive an auxiliary resisting and assisting force; auxiliary support lever means pivotally mounted on said support adjacent said pivot axis of said operating lever; means to adjustably secure said auxiliary support lever means in a plurality of positions with respect to said support whereby the operating force and linkage movement are not changed; said auxiliary support lever means having stop means thereon to limit movement of said operating lever in the opposite direction at one of a plurality of said initial positions; and over-center means including a pair of toggle links having a common central pivot and respective end pivots connected between said control portion and said auxiliary support lever means and including spring means anchored to said support and said central pivot of said toggle linkage to urge said operating lever against said stop means at any one of said initial positions and to resist movement of said operating lever in said one direction in said first range of movement and assist movement of said operating lever in said second range of movement.

16. In a control linkage mechanism; a support; an operating lever pivotally mounted on said support having an apply portion to receive an operating force to move said operating lever from an initial position in one direction through a first range of movement and then a second range of movement, a delivery portion to deliver an actuating force, and a control portion operative to receive an auxiliary resisting and assisting force; auxiliary support lever means pivotally mounted on said support; means to adjustably secure said auxiliary support lever means in a plurality of positions with respect to said support whereby the operating force and linkage movement are not changed; said auxiliary support lever means having stop means thereon adjustable with said auxiliary support lever means to limit movement of said operating lever in the opposite direction at any one of a plurality of initial positions; and over-center means including a pair of toggle links having a common central pivot and respective end pivots connected between said control portion and said auxiliary support lever means and including spring means anchored to said operating lever and said common central pivot to urge said operating lever against said stop means at any one of said plurality of initial positions and to resist movement of said operating lever in said one direction in said first range of movement and assist movement of said operating lever in said second range of movement.

References Cited by the Examiner

UNITED STATES PATENTS

| | | | |
|---|---|---|---|
| 1,865,130 | 6/32 | Moorhouse | 74—493 |
| 1,954,234 | 4/34 | Zimmerman | 192—99 |
| 2,236,653 | 4/41 | Starke | 74—504 |
| 2,321,513 | 6/43 | Reed | 192—99 |
| 2,734,105 | 2/56 | Perry | 200—86.5 X |
| 2,738,034 | 3/56 | Levine | 74—512 |
| 2,873,616 | 2/59 | Schilling | 74—478 |
| 2,882,744 | 4/59 | Keller | 74—512 |
| 2,884,803 | 5/59 | Willis | 74—512 |
| 2,884,804 | 5/59 | Muller | 74—560 X |
| 3,014,381 | 12/61 | Frank | 74—512 |
| 3,112,820 | 12/63 | Falk | 192—99 |

FOREIGN PATENTS

| | | |
|---|---|---|
| 569,362 | 1/59 | Canada. |
| 813,923 | 5/59 | Great Britain. |
| 920,784 | 3/63 | Great Britain. |

BROUGHTON G. DURHAM, *Primary Examiner.*

UNITED STATES PATENT OFFICE
CERTIFICATE OF CORRECTION

Patent No. 3,199,366                                              August 10, 1965

Fox John Herrington, Jr.

It is hereby certified that error appears in the above numbered patent requiring correction and that the said Letters Patent should read as corrected below.

Column 1, line 34, strike out "lever to provide the over-center action." and insert instead -- pedal pivot may be rotated relative to the --; column 2, line 55, after "auxiliary" insert -- lever --; line 72, for "center point" read -- central joint --; column 10, line 5, after "auxiliary" insert -- support --; line 58, before "lever", first occurrence, insert -- support --.

Signed and sealed this 5th day of April 1966.

(SEAL)
Attest:

ERNEST W. SWIDER                                        EDWARD J. BRENNER
Attesting Officer                                               Commissioner of Patents